United States Patent [19]

Chang et al.

[11] Patent Number: 4,892,796

[45] Date of Patent: Jan. 9, 1990

[54] POSITIVE CURRENT COLLECTOR FOR LITHIUM SECONDARY SYSTEM

[75] Inventors: On-Kok Chang; John C. Hall, both of San Jose; Jeffrey Phillips, Saratoga; Lenard F. Silvester, Scotts Valley, all of Calif.

[73] Assignee: Altus Corporation, San Jose, Calif.

[21] Appl. No.: 237,190

[22] Filed: Aug. 26, 1988

[51] Int. Cl.$^4$ .................... H01M 6/14; H01M 6/02
[52] U.S. Cl. .................... 429/196; 429/211; 429/161; 429/94
[58] Field of Search ............ 429/94, 161, 211, 196

[56] References Cited

U.S. PATENT DOCUMENTS

| | | | |
|---|---|---|---|
| 3,829,330 | 8/1974 | Dey | 429/211 X |
| 4,053,689 | 10/1977 | Breiter | 429/211 X |
| 4,452,869 | 6/1984 | De Moully et al. | 429/211 X |
| 4,794,056 | 12/1988 | Pedicini | 429/211 X |

Primary Examiner—Stephen J. Kalafut
Attorney, Agent, or Firm—Limbach, Limbach & Sutton

[57] ABSTRACT

A rechargeable non-aqueous electrochemical cell. The cell has a positive terminal, a negative terminal, a cathode collector attached to the positive terminal and an anode of alkaline metal connected to the negative terminal. The cell further possesses a non-aqueous electrolyte solution in contact with the cathode and anode. The cathode collector is composed of a chrome foil plated upon a core of nickel.

7 Claims, 3 Drawing Sheets

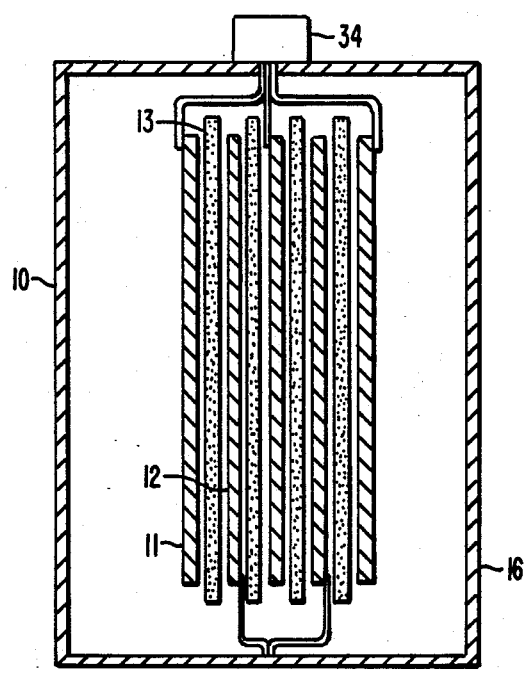
FIG._1.
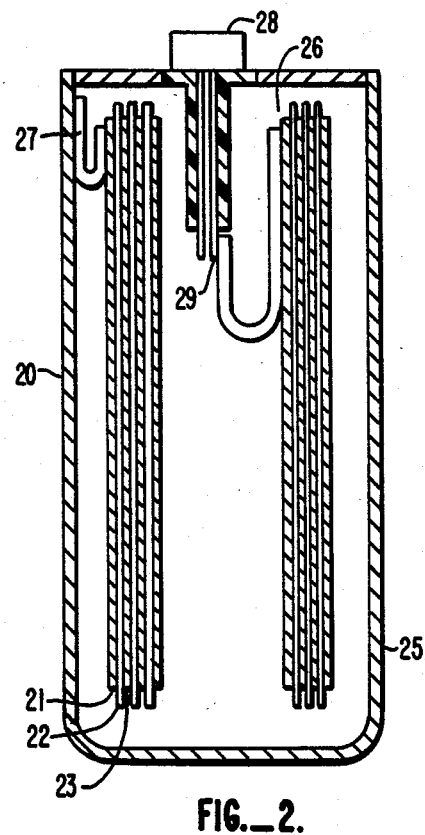
FIG._2.

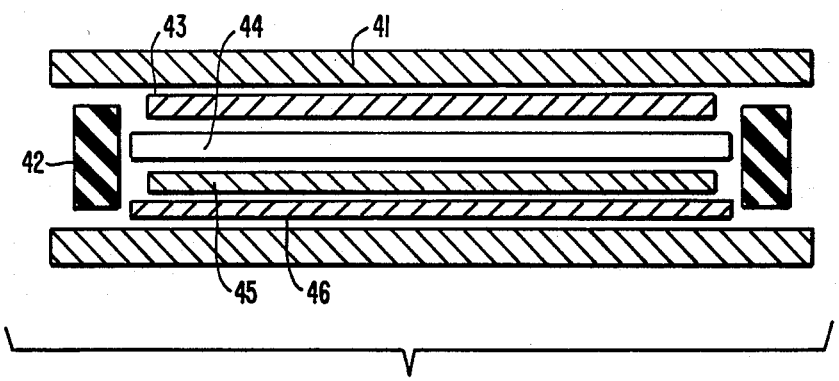
FIG._3.

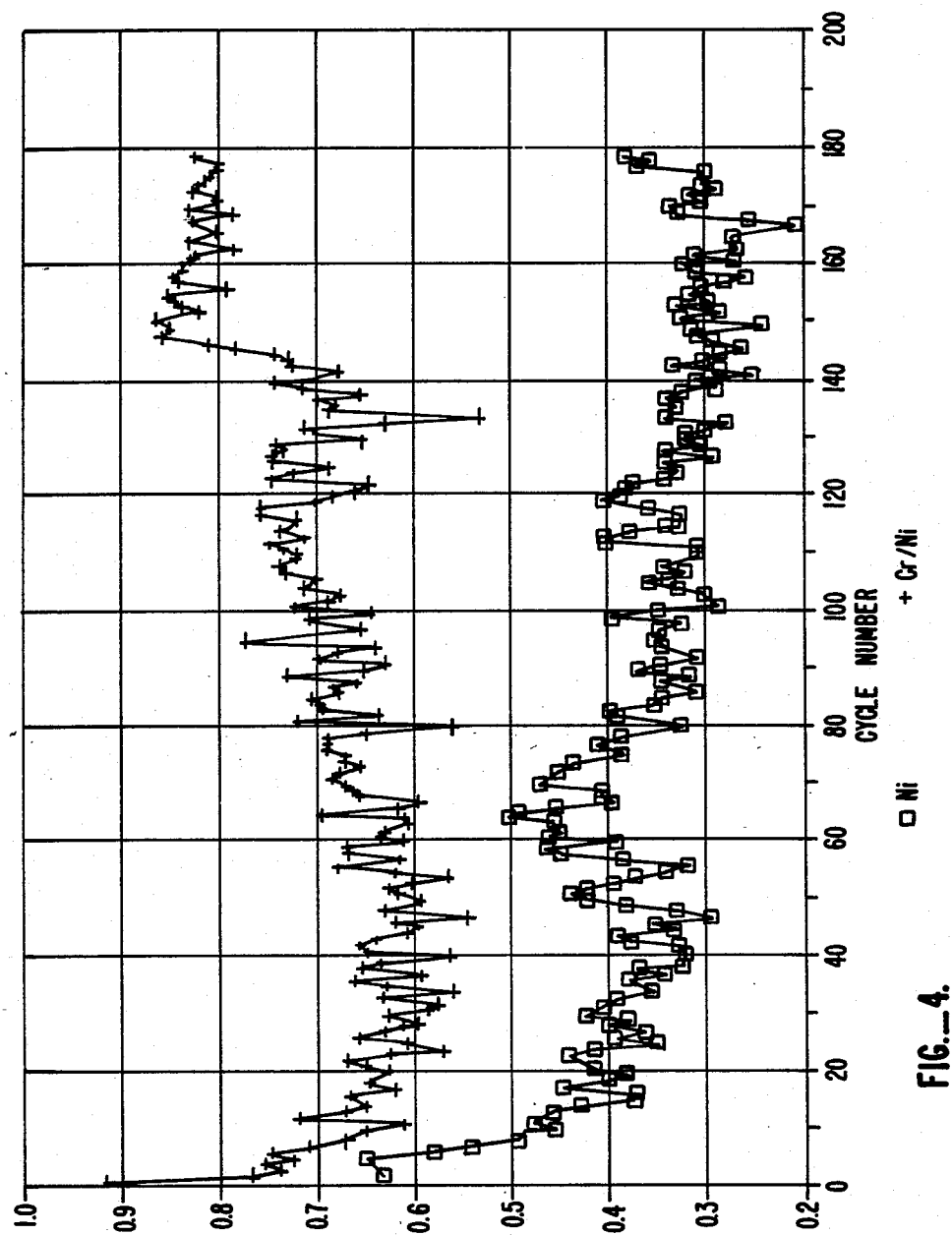
FIG._4.

POSITIVE CURRENT COLLECTOR FOR LITHIUM SECONDARY SYSTEM

TECHNICAL FIELD OF THE INVENTION

The present invention deals with a rechargeable electrochemical cell. It has been found that cell life, as measured by its ability to recycle without deterioration, is greatly enhanced when the cell's cathode collector is comprised of a specific composite of hard chrome plated to a nickel foil core.

BACKGROUND OF THE INVENTION

This invention relates, generally, to non-aqueous electrochemical cells and, more particularly, to inorganic cells employing an alkaline metal, such as lithium, as the anode, with a cathode collector separated from the anode by a separator membrane.

Among all the known combinations of lithium anodes with different cathodes and electrolytes, those believed to have among the highest energy density and lowest internal impedance use certain inorganic liquids as the active cathode depolarizer. This type of cell chemistry is commonly referred to as "liquid cathode," and it is with respect to this general chemistry that cells of the type disclosed herein are directed.

Early liquid cathode cells use sulfur dioxide as the active cathode depolarizer as described in U.S. Pat. No. 3,567,515 issued to Maricle, et al. on Mar. 2, 1971. Sulfur dioxide is also employed as a solvent in such systems. Liquid cathode cells using oxyhalides are described in U.S. Pat. No. 3,926,669 issued to Auburn on Dec. 16, 1975. As described in Auburn, the anode is generally lithium metal or alloys of lithium and the electrolyte solution is an ionically conductive solute dissolved in a solvent that is also an active cathode depolarizer.

The solute may be a simple or double salt which will produce an ionically conductive solution when dissolved in the solvent. Preferred solutes are complexes of inorganic or organic Lewis acids and inorganic ionizable salts. The requirements for utility are that the salt, whether simple or complex, be compatible with the solvent being employed and that it yield a solution which is ionically conductive. According to the Lewis or electron acceptor theory of acids and bases, many substances which contain no active hydrogen can act as acids or electron acceptors or electron donors. In U.S. Pat. No. 3,542,602 it is suggested that the complex or double salt formed between a Lewis acid and an ionizable salt yields an entity which is more stable than either of the components alone. A typical Lewis acid suitable for incorporation in cells of the type contemplated herein is aluminum chloride which, when combined with a suitable ionizable salt such as lithium chloride, yields lithium aluminum chloride ($LiAlCl_4$), which is maintained in a suitable solvent such as sulfur dioxide ($SO_2$).

In addition to an anode, an active cathode depolarizer and ionically conductive electrolyte, cells of this type also require the use of a current or cathode collector. According to Blomgren, as taught in British Pat. No. 1,409,307, any compatible solid, which is substantially electrically conductive and inert in the cell, will be useful as a cathode collector since the function of the collector is to permit external electrical contact to be made with the active cathode material. It was taught to be desirable to have as much surface contact as possible between the liquid cathode and current collector and, as such, most teachings have focused upon the use of a porous material, such as graphite, as the current collector.

It has now been recognized that for a non-aqueous secondary cell, the cathode collector should preferably be inert under certain severe environmental conditions. These include a marked inertness toward the electrolyte solvent solution of, for example, lithium aluminum tetrachloride ($LiAlCl_4$) in sulfur dioxide ($SO_2$). This inertness should evidence itself over the voltage range of 2.5 to 4.0 V, while also exhibiting an inertness towards overcharge products.

It is commonplace in non-aqueous secondary electrochemical cells to have cupric chloride present in the electrolyte solution. This is the result of the following reaction:

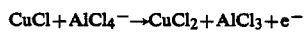

$$CuCl + AlCl_4^- \rightarrow CuCl_2 + AlCl_3 + e^-$$

Appropriate cathode collectors must also be inert towards cupric chloride and its reduced species, as well as display a low ohmic resistance, which is a necessary characteristic of any current collector for use in such an environment.

Unfortunately, very few materials are capable of displaying those necessary characteristics as outlined above. It is thus an object of the present invention to provide a novel rechargeable secondary non-aqueous cell having a current collector which is inert over the voltage range of 2.5 to 4.0 V to solutions of $LiAlCl_4$ ($SO_2$), and various overcharge products, as well as towards $CuCl_2$.

This and further objects of the present invention will be more readily appreciated when considering the following disclosure and appended drawings, wherein FIGS. 1 and 2 represent cross-sectional views of typical cell configurations having flat plate and spirally wound elements, respectively.

FIG. 3 is a cross-sectional schematic of a cell embodying the current collector of the present invention.

FIG. 4 is a graph of actual cell performance comparing the present invention with a non-invention cell.

SUMMARY OF THE INVENTION

The present invention deals with a rechargeable non-aqueous electrochemical cell having a positive terminal, a negative terminal, a current collector attached to the positive terminal and cathode and an anode of an alkaline metal connected to the negative terminal. A non-aqueous electrolyte solution is in contact with a cathode, such as $CuCl_2$ in graphite, and an anode. The improvement provided by the present invention is the use of a current collector comprising a chrome foil plated upon a core of nickel.

DETAILED DESCRIPTION OF THE INVENTION

The prior art has contemplated a myriad of potential candidates for use as cathodes in non-aqueous electrochemical cells. According to the teachings of British Pat. No. 1,409,307, any compatible solid, which is substantially electrically conductive and inert in the cell, is useful as a cathode current collector, since the function of the cathode is taught to permit external electrical contact to be made with the active (liquid) cathode material. As previously noted, in light of the fact that it is commonly known that a cathode collector should have as great a surface contact as possible between itself and the liquid within the cell, porous materials such as carbon have been taught as ideal cathodes for use in the present environment.

Unfortunately, all previously disclosed current collectors used in conjunction with porous cathodes of the prior art display a lack of inertness, particularly in the voltage range between 2.5 to 4.0 V, to the typical electrolyte solutions and solvents, as well as to overcharge products commonly found in such cells.

It has been surprisingly determined that a current collector comprised of a nickel foil coated with a hard chrome provided excellent physical and chemical properties far superior to any current collectors suggested by the prior art. Not only are such current collectors superior chemically, they are capable of being configured into either flat parallel plates or spirally wound elements. Such alternate configurations are shown in FIGS. 1 and 2.

More specifically, FIG. 1 depicts electrochemical cell 10 in cross-section, bounded by cell casing 16. Anode 11 and cathode current collector 12 are shown as flat, parallel plates. Ideally, anode 11, which is mechanically coupled to negative terminal 14, is comprised of lithium. Current collector 12, normally coupled to cell casing 16, comprises, pursuant to the present invention, a chrome foil, preferably from approximately 0.1 to 2 mils in thickness, plated upon a core of nickel.

Anode 11 and cathode current collector 12 are separated by separator material 13. Anode 11 is coupled to output terminal 34 as shown in FIG. 1. Electrical separation of the current collector and anode is required to ensure that cathode or anode reactions do not occur unless electrical current flows through an external circuit. Since the current collector is insoluble in the electrolyte, and the anode does not react spontaneously with the electrolyte, a mechanical separator may be used. An excellent separator material consists of a tetrafluoroethylene fluorocarbon polymer, such as Tefzel, sold by Raychem Corporation.

As an alternative embodiment, FIG. 2 shows cell 20 in cross-section bounded by cell casing 25. A spirally wound cell stack is comprised of alternative layers of anode 21, separator 22 and cathode current collector 23. Collection tab 26 is connected to the negative electrode and to pin 29, which is in turn connected to output terminal 28 located atop the casing. Tab 27, in turn, is connected to the positive cathode collector and to cell casing 25.

EXAMPLE 1

FIG. 3 demonstrates a schematic cross-sectional view of a single cell which was employed in generating the data of FIG. 4. More specifically, the cell of FIG. 3 consists of casing 41 which maintains, together with neoprene gasket 42, the contents of the subject electrochemical cell.

A 1 mil pure nickel foil was electroplated with a 1 mil layer of a hard chrome constituting current collector 46. This foil served as the backing plate and current collector for a 25 mil thick cathode sheet 45 which was separated from a 10 mil lithium foil anode 43 by a porous glass mat separator 44.

The hard chrome side of the current collector 46 was in contact with cathode 45 which consisted of a mixture of carbon and copper chloride.

FIG. 4 shows the cell capacity of the cell of FIG. 3 having a cross-sectional area of approximately 21 cm$^2$.

The cell was cycled between 3.95 and 3.2 V at 1 mA/cm$^2$ to provide cell capacities over 100 cycles. The uppermost plot line evidencing the use of a current collector of the present invention showed little capacity variance, while the bottom plot of an identical cell having a nickel current collector (without chrome plating) showed significant variance over the same number of cycles.

Schematically the cell of FIG. 3 was employed with a number of various current collectors noting both physical deterioration, if any, as well as variances in voltammetry results. In each case, the cells were identical, having lithium anodes and lithium aluminum tetrachloride electrolytes in sulfur dioxide with the single variant being the current collectors. These measurements and observations are provided in Table I evidencing the fact that only a current collector of chromium plated nickel showed no visible defects or lack of stability when recycled.

TABLE I

| Current Collector Material | Evaluation- Cell Cycling | Evaluation- Cyclic Voltammetry Results |
|---|---|---|
| Moly/Ni | Mo seperated from Ni substrata | — |
| Moly | No visible defects | Reduction peak at 2.5 → 3.2 V, and oxidation peak at 3.7 → 4.0 V |
| Ni | — | Inert, small oxidation above 3.8 V |
| Ni—200 | No visible defects | — |
| Graphite foil | Graphite foil, surface blustered | Large reduction wave |
| Cr/Ni | No visible defects | Inert, virtually no oxidation above 3.9 V |
| Al | No visible defects if charge voltage below 3.7 V, above 3.7 V, Al dissolves | Stable below 3.7 V, oxidation above 3.8 V |
| Graphite/Moly | Graphite foil, surface blistered | — |
| Al/Moly | Al dissolves | — |
| Ti | Ti dissolves | Large peaks over entire range |
| RuO2/Ti | Ti dissolves | — |
| 316-SS | SS dissolves | Reduction below 3.0 V, oxidation above 3.7 V |
| Cu | Cu dissolves | Nonreversible, dissolves over entire range |

We claim:

1. In a rechargeable non-aqueous electrochemical cell having a positive terminal, a negative terminal, a current collector and cathode attached to the positive terminal, an anode of alkali metal connected to the negative terminal and a non-aqueous electrolyte solution in contact with the cathode and anode, the improvement comprising a current collector comprising a chrome foil plated upon a core of nickel.

2. The rechargeable non-aqueous electrochemical cell of claim 1 wherein said alkaline metal comprises lithium.

3. The rechargeable non-aqueous electrochemical cell of claim 1 wherein said non-aqueous electrolyte comprises LiAlC$_{l4}$ in a solvent of SO$_2$.

4. The rechargeable non-aqueous electrochemical cell of claim 1 wherein said anode and said current collector are in the form of substantially flat, parallel plates separated from one another by a suitable separator membrane.

5. The rechargeable non-aqueous electrochemical cell of claim 1 wherein said anode and said current collector are in the form of spirally wound sheets separated from one another by a suitable separator membrane.

6. The rechargeable non-aqueous electrochemical cell of claim 1 wherein said cathode comprises $CuCl_2$ in carbon.

7. The rechargeable non-aqueous electrochemical cell of claim 1 wherein said chrome foil is approximately 0.1 to 2.0 mils in thickness.

* * * * *